(12) United States Patent
Cheek et al.

(10) Patent No.: US 10,542,145 B1
(45) Date of Patent: *Jan. 21, 2020

(54) METHOD AND APPARATUS FOR NAVIGATING AN AUTOMATED TELEPHONE SYSTEM

(71) Applicant: Creative Empowering Solutions, LLC, Dallas, TX (US)

(72) Inventors: Susan Cheek, Kaufman, TX (US); Shawn Storie, Wylie, TX (US)

(73) Assignee: CREATIVE EMPOWERING SOLUTIONS, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,799

(22) Filed: Nov. 30, 2018

Related U.S. Application Data (63) Continuation of application No. 14/616,462, filed on Feb. 6, 2015, now Pat. No. 10,178,232.

(60) Provisional application No. 61/937,747, filed on Feb. 10, 2014.

(51) Int. Cl.
H04M 3/493 (2006.01)

(52) U.S. Cl.
CPC ....... H04M 3/4938 (2013.01); H04M 3/4936 (2013.01)

(58) Field of Classification Search
CPC .......................... H04M 3/4938; H04M 3/4936
See application file for complete search history.

(56) References Cited

U.S. PATENT DOCUMENTS

| | | | |
|---|---|---|---|
| 8,489,401 B1 * | 7/2013 | Pettay | G06Q 10/06398 704/270 |
| 9,225,833 B1 * | 12/2015 | Koster | H04M 3/5175 |
| 10,341,488 B2 * | 7/2019 | Munns | |
| 2005/0177368 A1 * | 8/2005 | Odinak | H04M 3/51 704/246 |
| 2008/0101565 A1 | 5/2008 | Tyler | |
| 2008/0304632 A1 | 12/2008 | Catlin et al. | |
| 2009/0259492 A1 | 10/2009 | Cossman | |
| 2010/0002865 A1 * | 1/2010 | Kennedy | G06Q 10/00 379/265.11 |
| 2010/0310059 A1 | 12/2010 | Davis et al. | |
| 2013/0003943 A1 * | 1/2013 | Munns | H04M 3/5166 379/88.01 |
| 2013/0064358 A1 | 3/2013 | Nusbaum | |
| 2013/0246078 A1 | 9/2013 | Omidi | |
| 2013/0325599 A1 * | 12/2013 | Yeri | G06Q 30/02 705/14.49 |
| 2014/0050307 A1 | 2/2014 | Yuzefovich | |
| 2014/0254775 A1 | 9/2014 | O'Connor et al. | |
| 2014/0297319 A1 | 10/2014 | Caballero et al. | |
| 2015/0153227 A1 | 6/2015 | Shi et al. | |
| 2015/0156327 A1 | 6/2015 | Van Buren et al. | |
| 2017/0039045 A1 * | 2/2017 | Abrahami | A61B 5/0205 |
| 2018/0032755 A1 * | 2/2018 | Odinak | G06F 21/313 |

* cited by examiner

Primary Examiner — Lisa Hashem
(74) Attorney, Agent, or Firm — Pizarro Allen PC (57) ABSTRACT

A system and method of navigating an automated telephone answering system (TAS) may include recording incoming and outgoing portions of a call with the TAS, separating the recording into a series of prompt-response segments, customizing at least one response, and storing the segments as a script for use in subsequent calls to the TAS.

20 Claims, 11 Drawing Sheets

Transcribed info from BCBS Call for ERNESTO A    (176    )

To:         1-800-676-2583
Call Date:  1/28/2014 @ 10:43am CST
Status:     Success Full Call Recording: 702

Call Transcription:

... please be advised that a quarter eligibility and benefits is not a guarantee of payment all benefits are subject to eligibility medical necessity and the terms conditions limitations and exclusions of the patients health benefit plan at the time the services are rendered please note you for independence not listed on the membership file may have benefits available this patience covered under a participating provider option plan coverage beginning November first twenty eleven to current this patient is not subject to preexisting the three letter alpha prefix is the G P and the group number is seven please quote has been nice to a file that can be referenced by our customer advocate should you have any questions the confirmation number is one zero zero five six four three nine one seven now you can say repeat that or benefit details you can also say next patient or main menu or if you are through go ahead and hang up. ...

... the benefits for colonoscopy outpatient are as follows routine colonoscopy there is no co pay series no deductible services are payable at one hundred percent of the allowed amount with no out of pocket there is no out of pocket and a lifetime maximum is unlimited medical colonoscopy screening there is no co pay series no deductible uh three thousand dollars per calendar year as of today the amount Matt zero dollars services are payable at one hundred percent of the allowed amount with no out of pocket there is no out of pocket and a lifetime maximum is unlimited present it is cool rectal cancer screening there is no co pay series no deductible services are payable at one hundred percent of the allowed amount with no out of pocket there is no out of pocket and a lifetime maximum is unlimited recorded benefits are for in network services a primary care physician is not required for this patient under this plan reduced benefits may be available for services performed outside the network preauthorization is not required for this service claim must be filed within twelve months following service date ah again the confirmation number is one zero zero five six seven would you like me to fax this information to you ...

Related Documents

METHOD AND APPARATUS FOR NAVIGATING AN AUTOMATED TELEPHONE SYSTEM

CROSS-REFERENCE TO RELATED APPLICATION

This application is a continuation of U.S. application Ser. No. 14/616,462, filed Feb. 6, 2015, which claims priority to U.S. Provisional Patent Application Ser. No. 61/937,747, filed Feb. 10, 2014 the entire disclosure of each of the above is herein incorporated by reference.

COPYRIGHT NOTICE

This application contains material that is subject to copyright protection. Such material may be reproduced exactly as it appears in Patent and Trademark Office patent files or records. The copyright owner otherwise reserves all rights to such material.

FIELD

The disclosed method and apparatus generally relate to navigating and extracting user-specific and other information from an automated telephone system.

BACKGROUND

An automated telephone answering system ("TAS") may be used to provide user-specific and other information from a computer database. A caller may need to navigate the menu of an automated telephone answering system in order to obtain such information. Such navigation may require listening and responding to a variety of menu prompts in order to obtain the desired information. If the caller desires to obtain such information from time to time, the caller must call the answering system in each case, thus consuming valuable time. There exists a need for a substantially automated method and apparatus for calling, navigating and retrieving information from an automated telephone answering system.

SUMMARY

A method of navigating an automated telephone answering system (TAS), the method comprising the steps of: establishing a first connection by telephone with a human user and a TAS; recording an audible interaction between the human user and the TAS, the interaction comprising prompts from the TAS and responses to the prompts from the human user; dividing such recording into segments, each segment comprising a prompt and a response to said prompt; receiving input from the human user customizing a response; and after receiving the input, storing the segments as a call script. The foregoing method further comprising the steps of: establishing a second connection by telephone with a TAS, the second connection at least initially excluding human user participation; using said call script to interact with a TAS; recording the interaction with the TAS; and transcribing at least part of the recording to text.

BRIEF DESCRIPTION OF THE DRAWINGS

FIG. 7 illustrates one embodiment of a user interface for a program embodying a method for displaying a call transcription.

DETAILED DESCRIPTION

Figure 1:
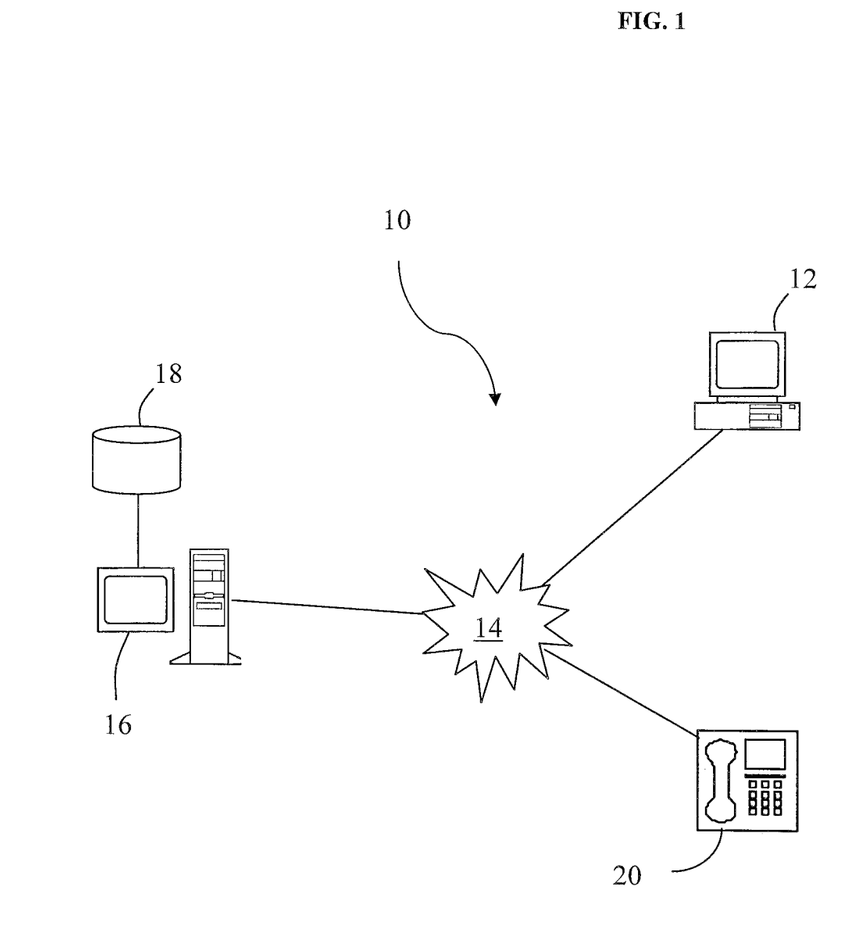
FIG. 1 illustrates/depicts one embodiment of a system for navigating a TAS.

FIG. 1 illustrates an exemplary system 10 for navigating an automated telephone answering system ("TAS"). In the embodiment of FIG. 1, the system 10 comprises may comprise a computer 12 and user telephone 20 in communication with a TAS 16 via a communications network 14. The TAS 16 may comprise a database 18 containing data. In some embodiments, the TAS 16 may be provided by a health insurance provider.

In one embodiment, the system and method may be illustrated through the example of a doctor calling an insurance provider to obtain patient benefits information. If a patient visits a doctor for treatment, a health insurance provider may pay for the treatment. In such case, the doctor may call the health insurance provider to determine the availability of patient benefits, e.g., whether the patient's insurance provider will pay for, or cover, the particular treatment to be provided by the doctor. As used in these embodiments, the term "doctor" may encompass personnel working at the doctor's office, a third-party medical billing provider, or any other person that may call the insurance company on the doctor's behalf. The health insurance provider may provide a TAS for the doctor to call in order to obtain benefits information. The doctor may interact with the TAS. A doctor may be required to dial the TAS phone number, and navigate one or more menu options and provide responsive information in order to obtain the benefits information. The various menu options may lead the doctor through one or more call segments. For example, a doctor may be required to verbally provide patient information, the doctor's practice information, a medical billing code, and/or other information. The TAS may receive and process the information from the doctor, and prompt the doctor for additional information or provide the desired benefits coverage information, as the case may be. The process of manually (verbally) interacting with a TAS for a single patient may take several minutes. The disclosed systems and methods may automate all or part of the doctor's interaction with the TAS, thus saving valuable time.

The computer 12 may comprise a program configured to instantiate one or more of the features and functionalities illustrated in FIGS. 2-11. The program may provide a user interface such as that seen in FIGS. 2-7, that may allow user interaction with the program. For example, the user interface may comprise a series of web pages hosted at a URI, if the program is provided through a SaaS model (in which case the computer 12 may comprise one or more servers and associated databases). Or, the user interface may comprise the user-perceivable manifestation of the program if locally installed. The program may, for example, embody a method of electronically capturing the incoming and outgoing audio portions of a call to an insurance provider, converting the audio portions of the call to text to create a visual record of the information conveyed audibly, configuring prompt and response sequences for user-specific information and storing all or part of the incoming and outgoing portions for subsequent automated navigation of the TAS.

Figure 2:
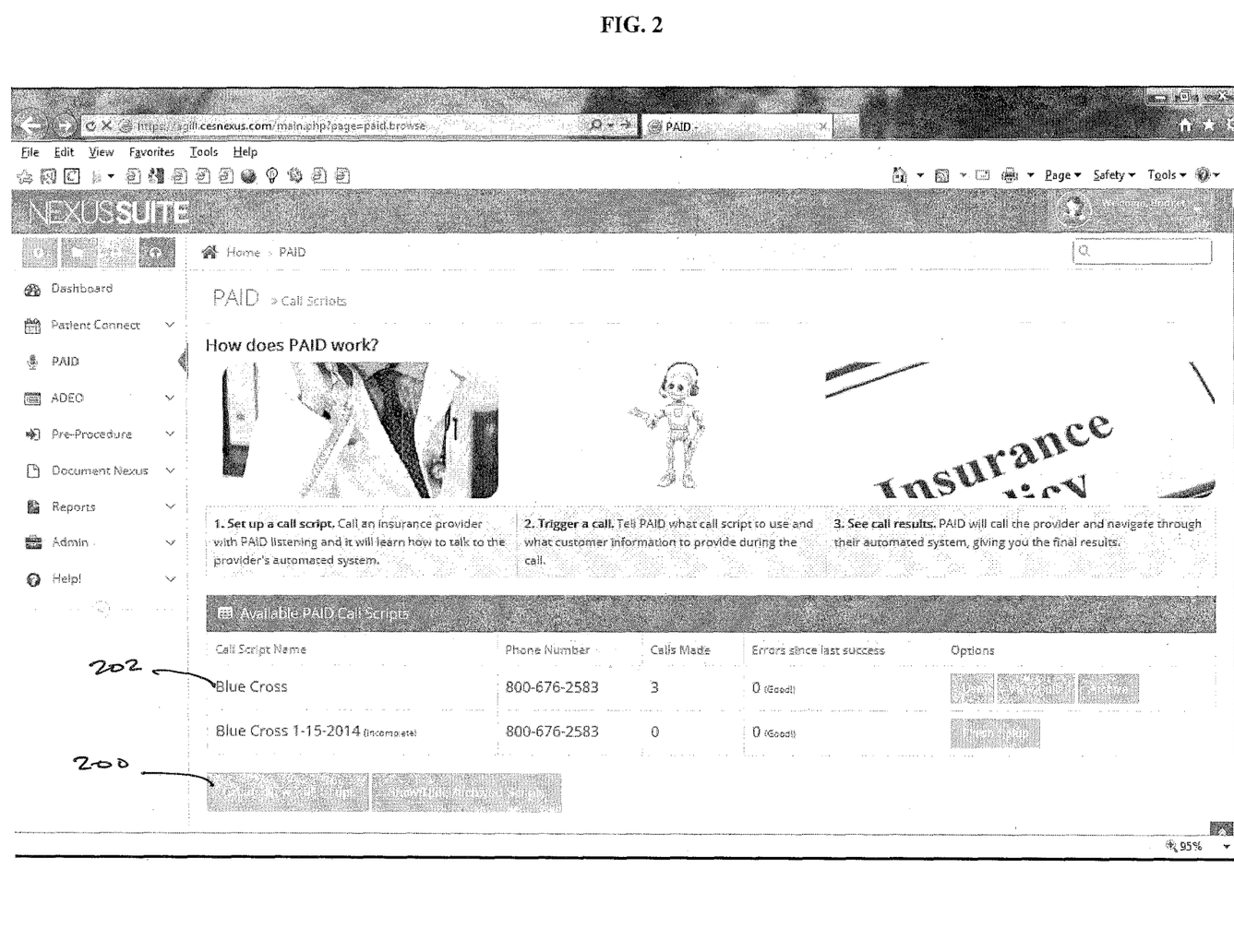
FIG. 2 illustrates one embodiment of a user interface for a program embodying a method for creating and using a call script.

As may be seen in the embodiment of FIG. 2, such a program (called "PAID" in this embodiment) may allow a user to create a call script to substantially automate all or part of a call to an insurance provider. To create a new call script, a user may click on the "Create a New Call Script" button 200. Upon doing so, a user may be presented with options for naming the call script, adding a phone number for the program to use to call an insurance provider TAS, and adding the user's phone number, as may be seen in the embodiment of FIG. 3. Of course, a user may also select an existing script 202 to use or modify.

Figure 3:
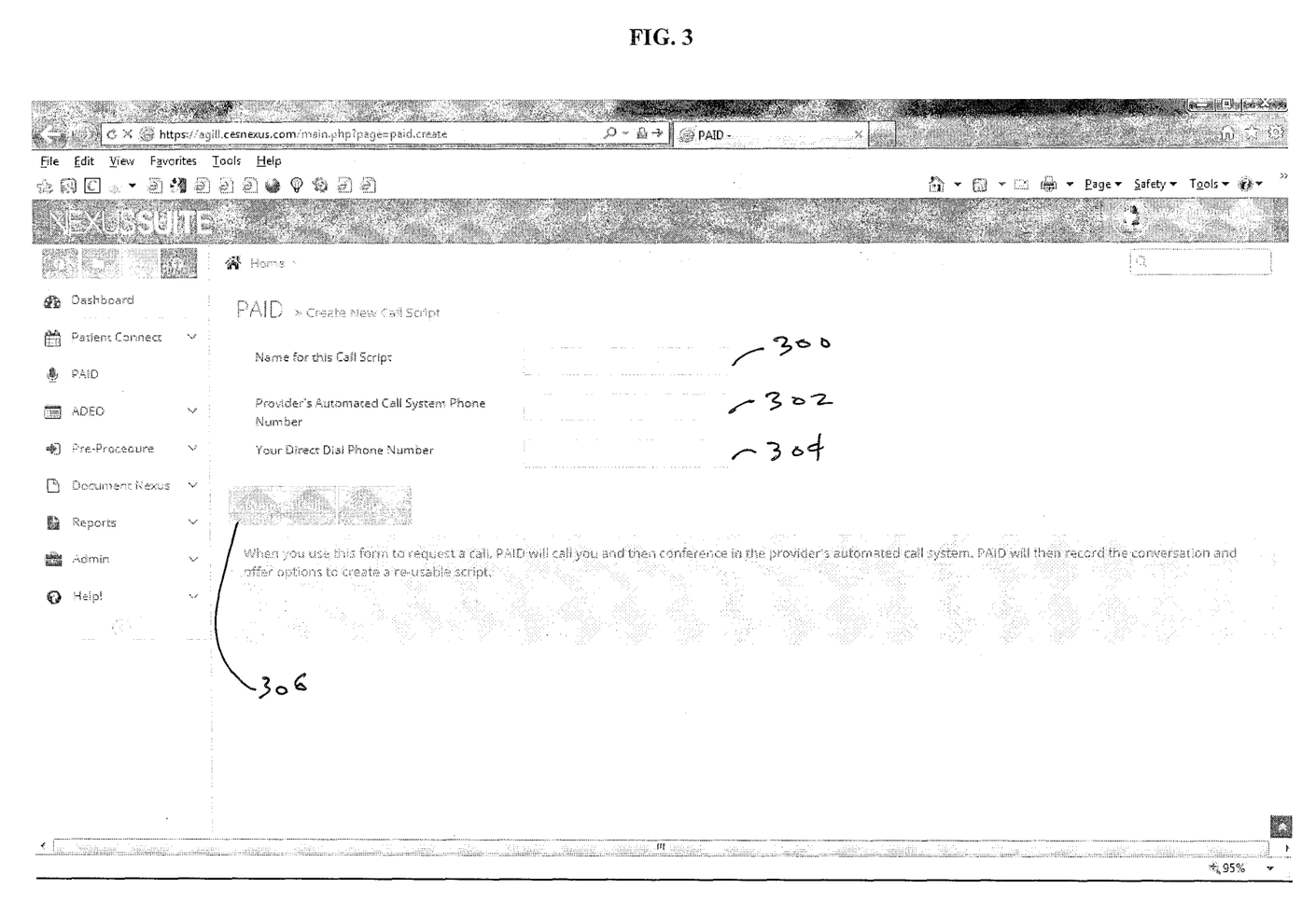
FIG. 3 illustrates one embodiment of a user interface for a program embodying a method for creating a call script.

With reference to FIG. 3, the user may create a new script name 300, add a new TAS phone number 302, and provide the user's phone number 304. The user may click on the "Request Call" button 306 to prompt the program to call the user's phone, and then conference call the insurance provider's TAS. Thus, the program may monitor the interaction between the user and the TAS. When the TAS answers the call, the program may record both the incoming and outgoing audible portions of the call. An incoming portion may, for example, comprise a prompt by the TAS for patient ID number or patient insurance coverage information. Any information provided by the TAS may be deemed a "prompt" for purposes of this example. An outgoing portion of the call may comprise a response to that prompt providing the patient ID number. Each prompt and response may comprise a call segment.

Figure 4:
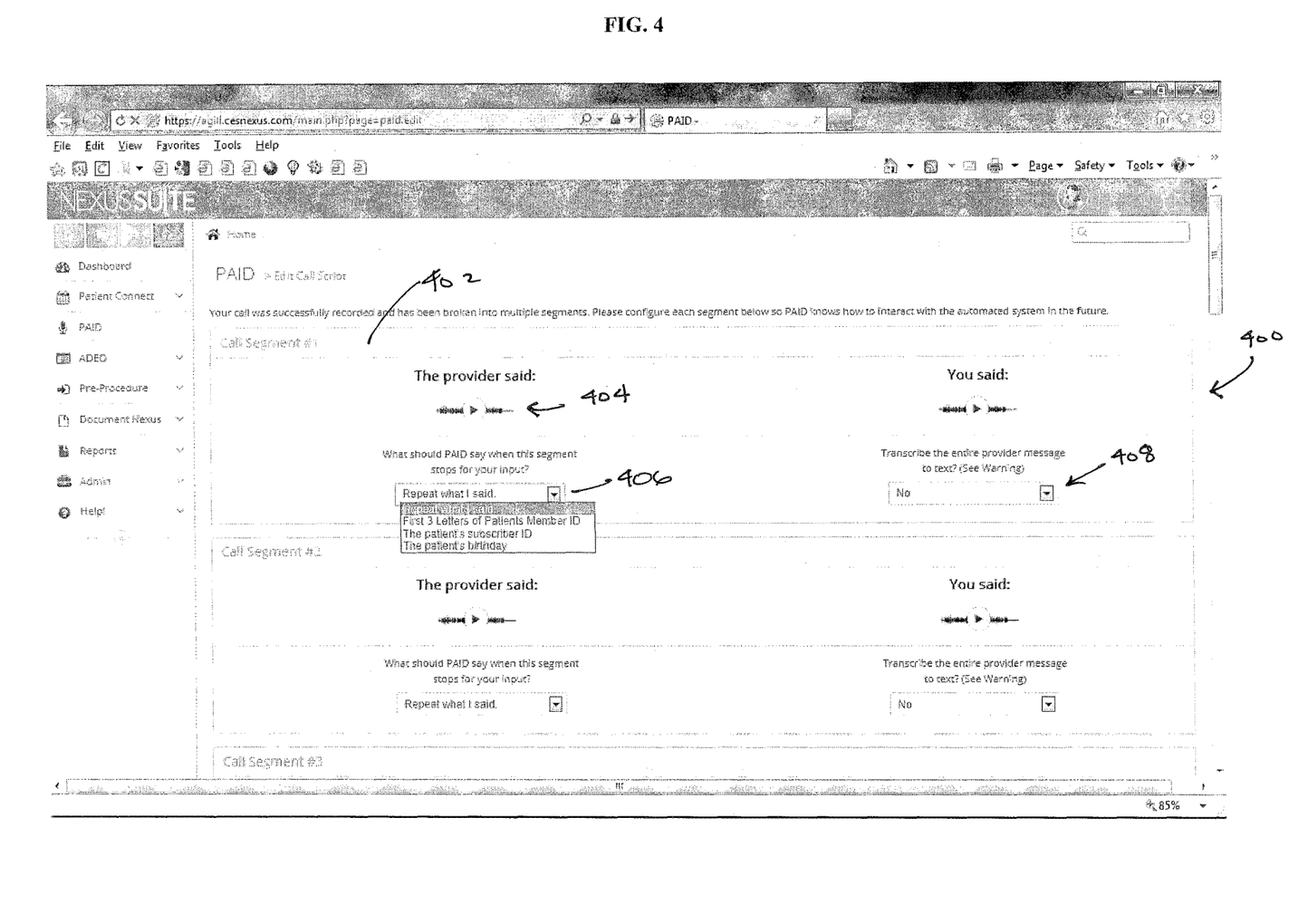
FIG. 4 illustrates one embodiment of a user interface for a program embodying a method for customizing a script response.
Figure 5:
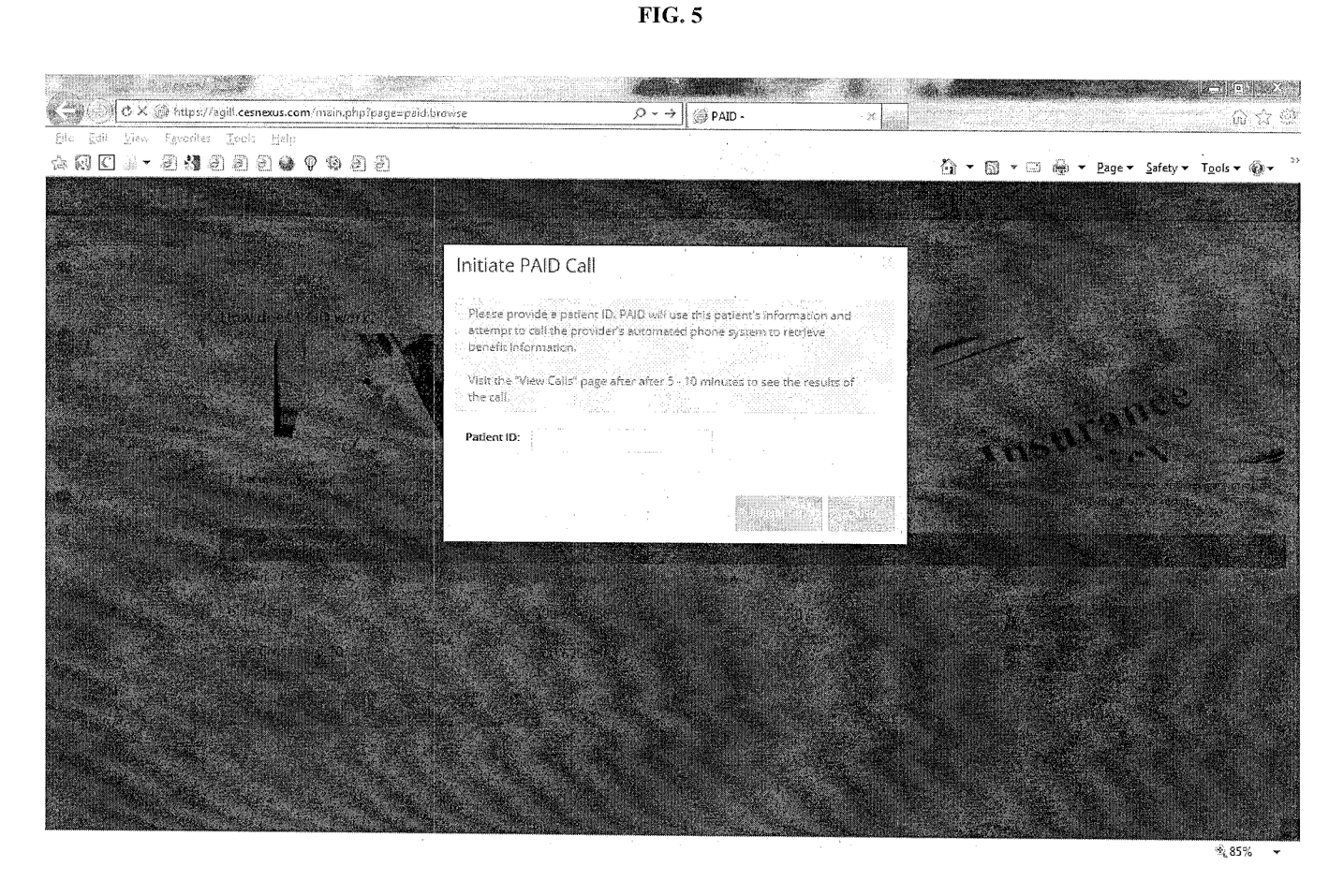
FIG. 5 illustrates one embodiment of a user interface for a program embodying a method for initiating use of a call script.

After the call is complete, the program may present the user with one or more segments 400 of the call, as may be seen in the embodiment of FIG. 4. The segments may be provided in an audible format and/or in a visual format. For example, for a first segment 402, the user may play back an audio file 404 comprising what the insurance provider said, and the program may transcribe or convert the audio to text. The transcribed text (not shown) may be displayed in the user interface field corresponding to the first segment. Any suitable speech-to-text ("STT") program or service may be used, such as Google Voice or AT&T WatsonSM. The user may, however, take a precaution of using a proprietary or secure STT program to avoid transmitting legally protected patient information through non-secure systems.

In some embodiments, the program may further allow the user to customize a response to a provider TAS prompt. A user may, of course, simply require the program to repeat exactly what the user said by playing back the audio of the user responding to the TAS during the initial setup call. In some embodiments, the audio of the user may comprise one or more touch-tone sounds resulting from a user keying in data using a telephone keypad in response to a prompt. A user may alternatively select a suitable response from a drop-down menu in order to allow the program to input patient-specific information. As may be seen in FIG. 4, for example, a drop-down menu 406 may allow the user to require the program to state the first three letters of a patient's ID, the patient's insurance subscriber ID, or the patient's birthday. Thus, the same script may be used to obtain information from an insurance provider TAS for multiple patients served by that insurance provider. If a call is initiated from a patient file, then the program may use a script standardized for a particular insurance provider, and the program may augment the script with patient-specific information.

The user may also specify which segments, if any, should be transcribed 408 for inclusion in a patient file. For example, the user may determine that the seventh of ten segments contains information pertaining to patient benefits, and may thus specify that the seventh segment of each call using that script should be transcribed to text for inclusion in a patient file. In such an example, the next, say, five calls for five different patients may be made to the same insurance provider TAS using the same call script (which may be modified with patient-specific information as described below). Although different patient IDs may be used, the program may transcribe segment seven for each call. In some embodiments, the program may prompt user confirmation before transcribing such segment. An opportunity to confirm may be useful if the user has reason to believe that the provider TAS changes the sequence of prompts occasionally, or occasionally includes certain information in the segment that the user does not want to transcribe.

An example of a call segment transcription may be seen in FIG. 7. The transcription 700 may be included in a patient file in order to resolve potential coverage or billing disputes. The original audio file 702 may also be preserved and associated with the patient file in order to verify the accuracy of the transcription. Time and date stamps may further serve to identify the particular call segment.

For example, with reference to FIG. 4, the user may select "patient subscriber ID" from the dropdown menu. If, for example, a doctor has more than one patient covered by the same insurance provider, the doctor may have to call that insurance provider multiple times for each patient. In each case, the insurance provider's TAS may provide the same sequence of prompts, and the doctor's response may be patient-specific. Thus, if the program is initiated from within a patient file, the program will automatically know the patient ID to which the call pertains.

The program may, for example, use a text-to-speech ("TTS") program, such as that provided by CEPSTRAL™, capable of converting text to speech in order to convert a text form of patient ID from the patient file to speech recognizable by the TAS. By selecting "patient subscriber ID" from the dropdown menu, the program may use the same script for multiple calls with an insurance provider TAS to obtain information for more than one patient, and use or "speak" the correct ID number of the patient for whom the program is calling. Of course, if a TAS allows, the program may, after obtaining information for one patient, remain connected to the TAS in order to repeat the script sequence for a different patient. In practice, however, it may be simpler for the program to disconnect from the TAS after receiving the desired patient information, and initiate separate calls for different patients.

In some embodiments, a user may be able to save a partially-completed script and complete setup at a later time. Once a script has been completed, a user may use the script for subsequent calls to an insurance provider. If a call is initiated outside of a patient file, a user may be prompted (as in FIG. 5) to provide the patient ID number so that the program can use that information from the call, and may also use that ID number to retrieve further patient information for use with the call.

Similarly, the script may be changed from time to time. In some embodiments, a user may learn that a sequence of TAS prompts has changed. The program may allow the user to "drag" or rearrange the segments into a different order using a suitable I/O device such as a mouse. Or, if certain prompts have changed, the program may re-initiate a setup call to either have the user re-interact with the TAS through the entire call, or interact only for those portions that the program does not recognize as part of the script.

In such a way, a call script can be customized when insurance providers change phone numbers and/or prompts. The program may detect variations from the script. In some embodiments, the program or a user may select one or more keywords from each segment prompt and store such keywords in a separate file for invocation during a call. When interacting with a TAS, the program may convert speech to text for each segment prompt and determine whether the keywords are used in the prompt.

Because STT engines may not be 100% accurate, the program may assign a certainty threshold to the determination, for example, 60%. For example, if the user or program selects three keywords to search in a given prompt, and the program finds two of the three keywords, then the program may determine that the certainty threshold has been satisfied and that the TAS prompt conforms to the script. For example, if a TAS script indicates that the TAS is supposed to state "Please state your patient ID number," the program may check to see if the words "patient", "ID" and "number" are included in the prompt. If two of those three words are included, then the program may assume that the TAS has not substantially changed the prompt, and provide the scripted response. If the program does not detect two of those three words, then the program may conclude that the TAS has substantially changed the prompt, and initiate a call hand-off to a human operator.

Thus, an STT program may be used to determine one or more segments in a call and can therefore detect deviations from the script. This detection of changes may be provided as part of a call log so that a user may determine whether and to what extent a script would require modification. For example, a detected field may be shown in a call log, where X may be the number of segments that were accurately determined by the script and Y may be the total number of segments of the call script by which such results would prompt the user to create a new call script.

In some embodiments, the program may compare audio prompts, while in other embodiments, the program may compare transcriptions of the prompts, or both, in order to determine whether the TAS sequence or segments have been changed. For example, the program may compare the segment audio and/or transcription against the audio and/or transcription of other segments to see if the segments have been re-ordered. In some embodiments, the program may compare the audio portion of the TAS against the corresponding audio of the script segment to see if a different voice signature is detected. A different voice signature may indicate, for example, that a human operator is participating in the TAS, or that the TAS has terminated and handed off the call to a human operator.

In other embodiments, a TAS may hand off a call to a human operator working for or on behalf of the provider. For example, the TAS may lead the program through one or more call segments, and then state in a final segment: "Please wait for the next available operator." The program may detect that transition by recognizing the audio or audio transcription, and notifying the user (such as the doctor) that the TAS has terminated and that the program is on hold waiting for a human operator. Upon detecting termination of the hold and transition to a live human operator, the program may automatically trigger a user's phone to ring, or to activate a speakerphone function to alert the user that a human operator is waiting to speak to the user. The program may detect the initiation and termination of a call hold by detecting audible clicks or beeps, or the beginning and end of "on hold" music or other audio content. The program may continue to record the audio conversation, or may terminate, as set by the user either when creating the script or upon the user interacting with the program when engaging the human operator. In some embodiments, the program may, upon detecting the termination of a call hold, ask the human operator to pause while the program patches the call through to the user.

Figure 6:
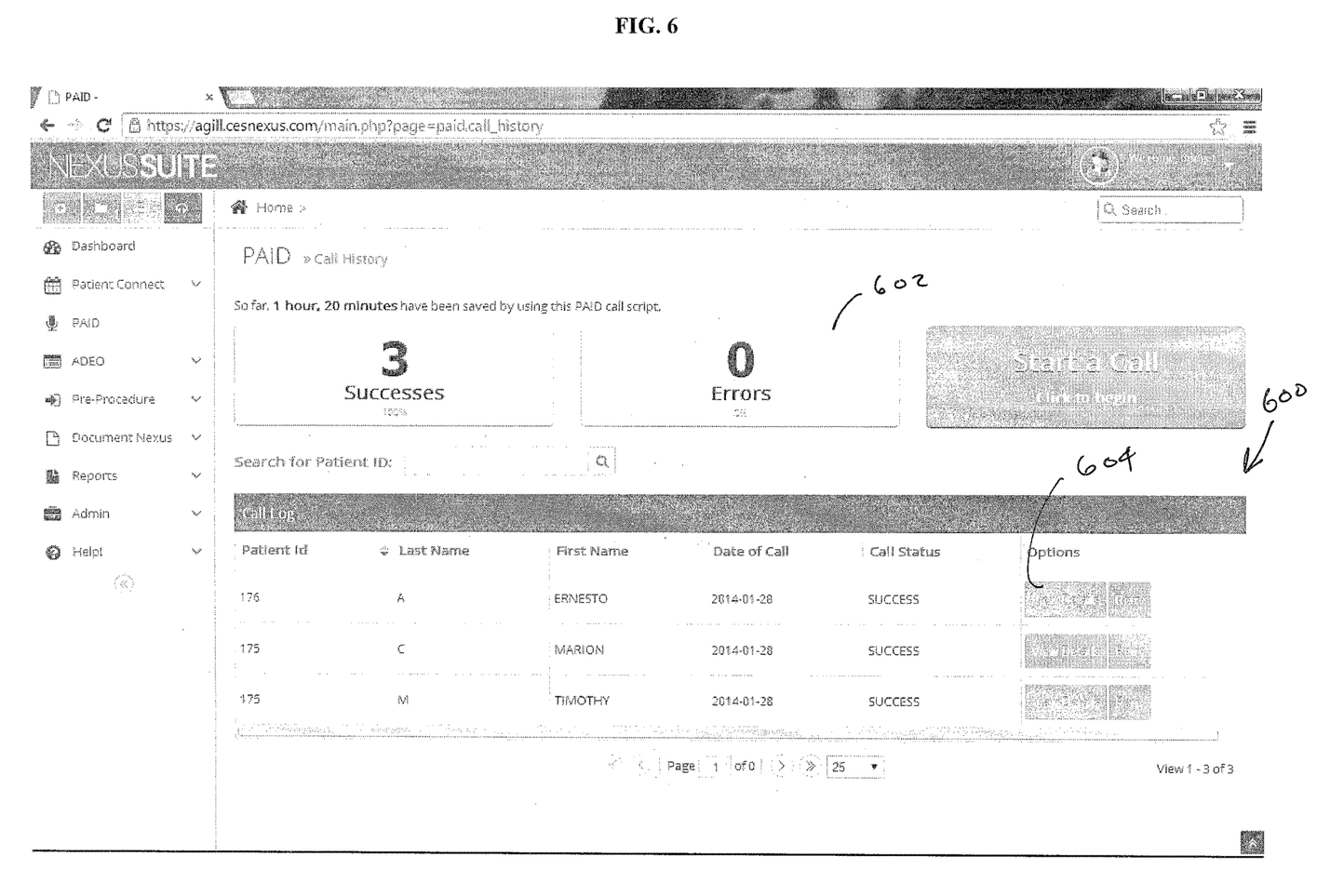
FIG. 6 illustrates one embodiment of a user interface for a program embodying a method for reviewing a log of calls made using a call script.
Figure 8:
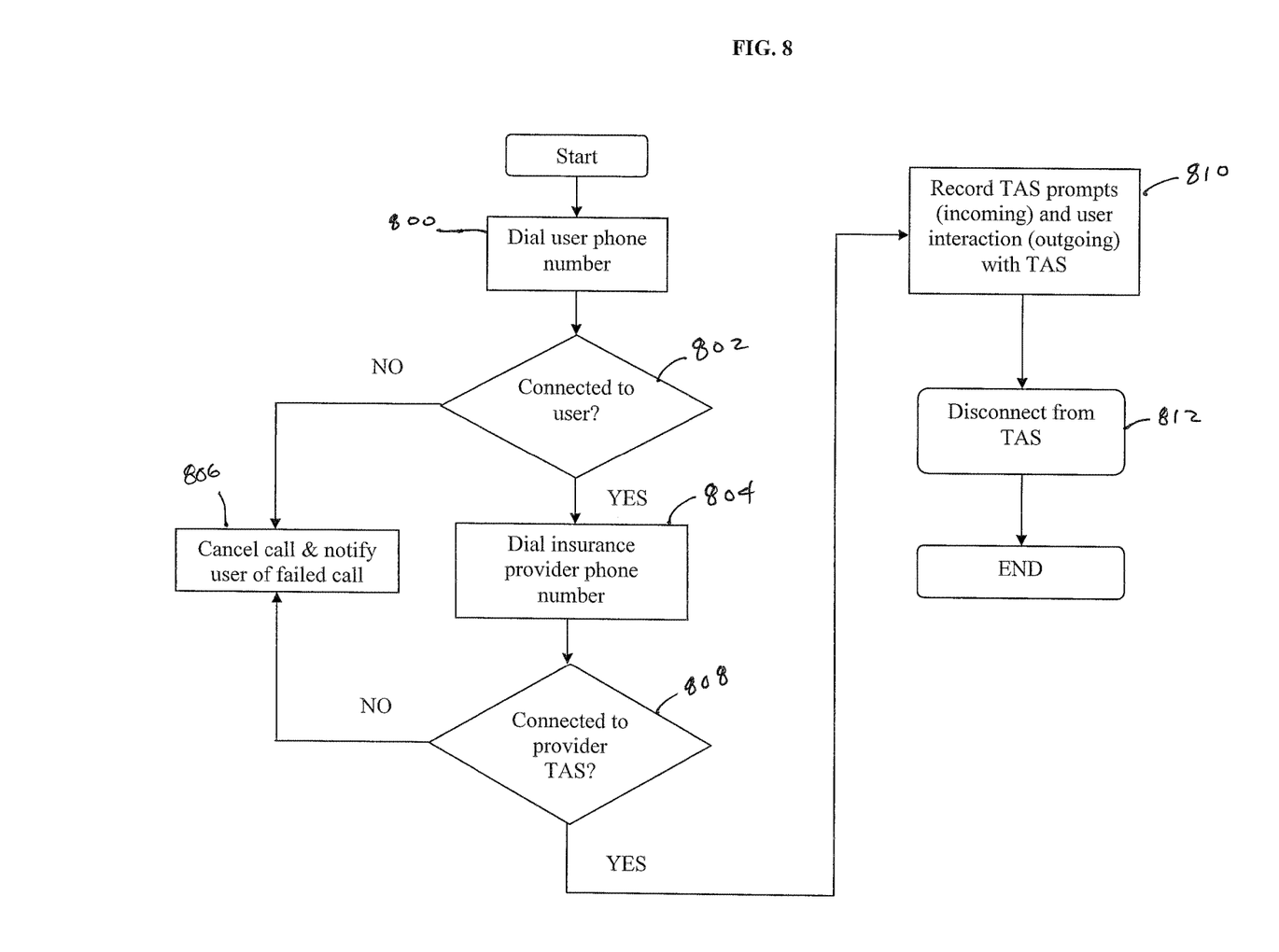
FIG. 8 illustrates one embodiment of a method for initiating a setup call.

With further reference to FIG. 6, the program may provide a call log 600 that the user may view to see a history of calls made to an insurance provider. The program may allow a user to sort the call log by patient, by name, date, and or other call data. The call log may also provide an indication 602 of unsuccessful calls. The user may also listen 604 to various call segments of each call placed by the program, and obtain a STT transcription of patient benefits.

If a call script becomes obsolete or the doctor no longer has patients using a particular insurance provider and thus no longer needs regular use of the call script, a user may archive the call script. If the doctor later consults with a patient having insurance from that insurance provider, then the doctor may retrieve the archived call script and resume use. The call script can also be customized as particular insurance companies change their call numbers and prompts. The STT feature may be used to determine the current segment in a call and may therefore detect changes that are needed to interact with the TAS. This detection of changes would result in an X out of Y segments detected field shown in the call log, where X is the number of segments that were accurately determined by the script and Y is the total number of segments of the call script by which such results would prompt the user to create a new call script.

By providing an automated system and method for navigating and obtaining information from a TAS, a doctor may save substantial time that otherwise would be used in interacting manually with the TAS. Furthermore, by having an audio recording and text transcription of each call, a doctor may be able to more easily resolve disputes with an insurance provider regarding the scope of patient insurance coverage.

In some embodiments, the program may embody a variety of algorithms or methods as illustrated by the flowcharts of FIGS. 8-11. In step 800 the program may dial a user telephone number, and if connected in step 802, then in step 804 dial an insurance provider phone number. In step 802, if the program cannot connect to the user or to the insurance provider by phone, then in step 806 the program may notify the user of connection error. If the program can connect to both user and insurance provider TAS in step 808, then in step 810 the program may record the audible portions of the call in step 812. After the user or TAS disconnects from the call, the program may stop recording and store the recording for later processing.

The program may process the recording in a number of ways. For example, as may be seen in FIG. 9, the program may discriminate between the incoming and outgoing portions of the call by using audio characteristics of the TAS, silences, clicks, beeps and/or keypad entry tones. In step 900, the program may divide the recording into sub-files containing a discrete prompt or response. Again, a prompt may include specific information concerning, for example, insurance coverage. The program may then group the sub-files into prompt-response segments for presentation to a user. A segment may contain, for example, a prompt for patient ID, and a response may be recitation of patient ID number. Or, a prompt may contain a statement of patient insurance coverage, and a response may be call termination.

Figure 11:
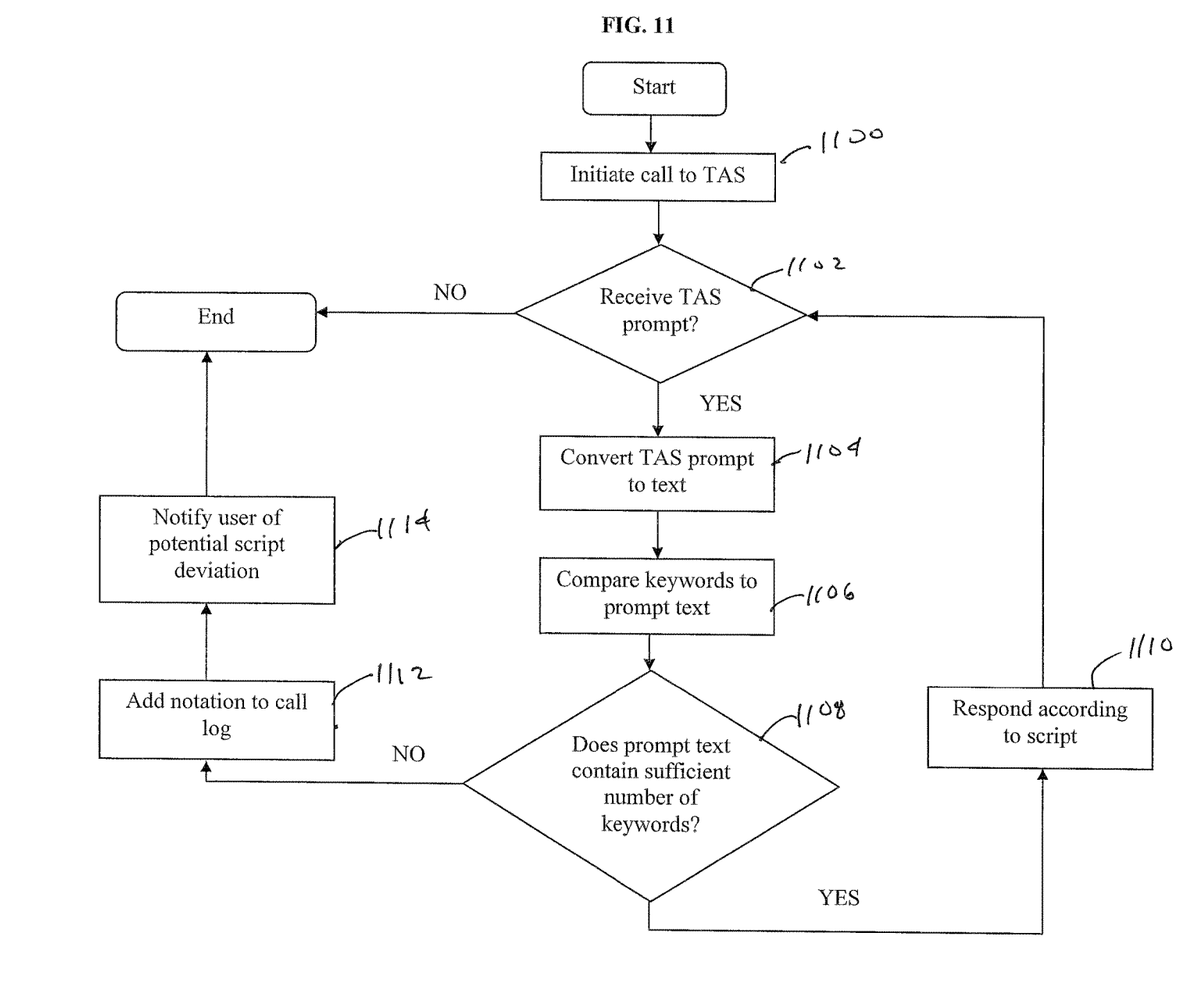
FIG. 11 illustrates one embodiment of a method for validating a prompt.

In other embodiments, such as in FIG. 11, the program may initiate a call to a TAS (step 1100). If the program receives a TAS prompt (step 1102), the program may determine if certain keywords or audio signatures are contained in the prompt. If not, then the program may update a call log with an error and notify the user of a potential deviation from the script. For example, to do so, the program may convert the TAS speech to text (step 1104) and compare them to the prompt text (step 1106). If the keywords or audio signatures are present (step 1108), then the program may respond to the prompt according to a call script (step 1110), and proceed through the call according to the script until a potential deviation is found, logged (step 1112), and the user notified (step 1114), or until the TAS prompt sequence ends and the program disconnects or connects the user to a human operator.

Figure 9:
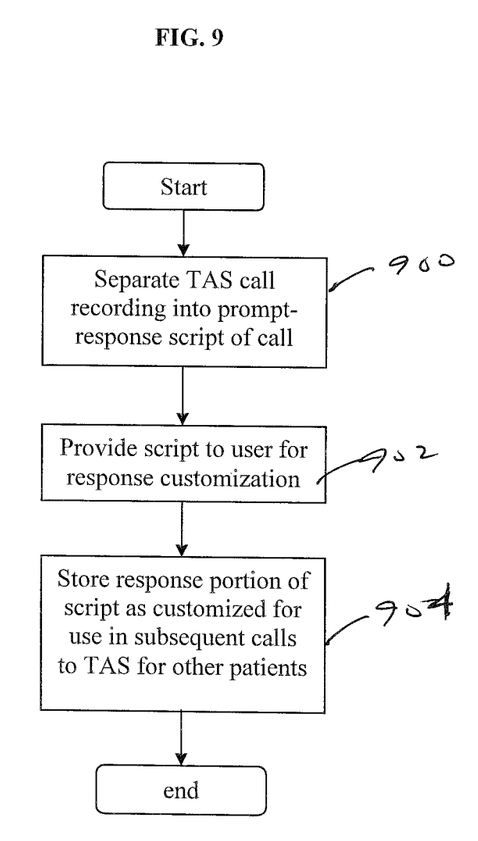
FIG. 9 illustrates one embodiment of a method for preparing a call script.

In step 902, the segments may be presented to a user, such as through a computer graphical user interface or other suitable I/O device as discussed above. A user may interact with the segments using a suitable I/O device, such as a mouse, and may play back different portions of the segment using any suitable media player. The program may also present a user with a text transcription of the segment portions. The program may further provide a user with menu items or form fields or other selections for the user to identify how the program should interact with a TAS for future calls. For example, the user may confirm that the caller response should be played back to the TAS just as provided in the initial setup call. Or, the caller may select an item instructing the program to use different information to interact with the TAS, such as a patient ID. In step 904, the customized segments may be stored in a TAS call script file for the program to use to call and navigate through a TAS. Thus, when a program calls the TAS and connects, the program may interact with the TAS with the call script as customized by the user.

Figure 10:
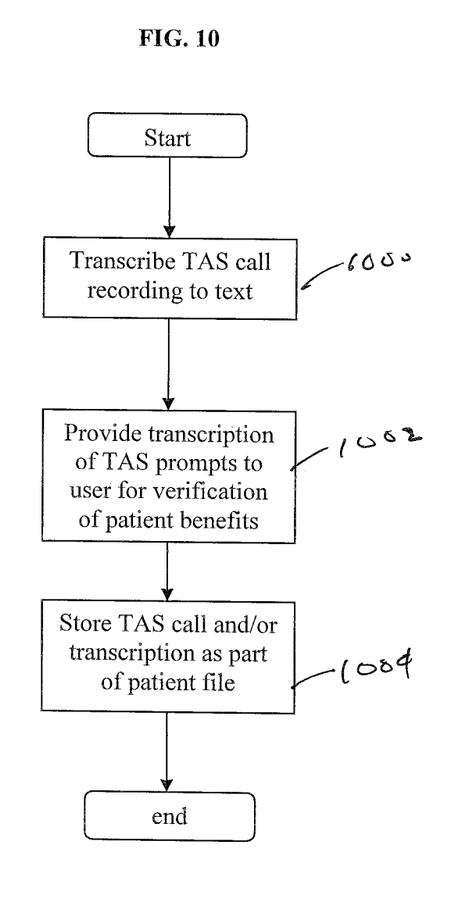
FIG. 10 illustrates one embodiment of a method for preparing a TAS call recording for storage with a patient file.

With further reference to FIG. 10, calls made by the program to a TAS may be recorded for storage in memory with a patient file. In step 1000 such calls may be transcribed from speech to text, formatted appropriately, tagged with patient file information, presented to the user for review and verification (step 1002), and in step 1004 stored as part of a patient file. In some embodiments, the transcribed call may be presented to a user along with the audio recording so that the user may correct mis-transcribed speech and format the transcription. Storage of call records may be useful in resolving disputes over insurance coverage.

Of course, the foregoing system and method for navigating a TAS may be applied in a variety of contexts. A program as described above may be used to conduct credit checks with credit bureau TAS, to navigate the TAS of various government agencies, and the like. In some embodiments, the foregoing program may be readily adapted to interact with the TAS of non-medical insurance providers, banks, credit card companies, retail department stores, travel companies, or any other TAS provided for A computer may be any device capable of accepting input, processing the input according to a program, and producing output. A computer may comprise, for example, a processor, memory and network connection capability. Computers may be of a variety of classes, such as supercomputers, mainframes, workstations, microcomputers, and PDAs, according to the computer's size, speed, cost and abilities. Computers may be stationary or portable, and may be programmed for a variety of functions, such as cellular telephony, media recordation and playback, data transfer, web browsing, data processing, data query, process automation, video conferencing, artificial intelligence, and much more.

A program may comprise any sequence of instructions, such as an algorithm, whether in a form that can be executed by a computer (object code), in a form that can be read by humans (source code), or otherwise. A program may comprise or call one or more data structures and variables. A program may be embodied in hardware or software, or a combination thereof. A program may be created using any suitable programming, scripting and/or database language, such as C, C++, Java, Perl, PHP, Python, Ruby, SQL, and others. Computer software may comprise one or more programs and related data. Examples of computer software include system software (such as operating system software, device drivers and utilities), middleware (such as web servers, data access software and enterprise messaging software), application software (such as databases, video games and media players), firmware (such as software installed on calculators, keyboards and mobile phones), and programming tools (such as debuggers, compilers and text editors).

Memory may comprise any computer-readable medium in which information can be temporarily or permanently stored and retrieved. Examples of memory include various types of RAM and ROM, such as SRAM, DRAM, Z-RAM, flash, optical disks, magnetic tape, punch cards, EEPROM. Memory may be virtualized, and may be provided in or across one or more devices and/or geographic locations, such as RAID technology.

An I/O device may comprise any hardware that can be used to provide information to and/or receive information from a computer. Exemplary I/O devices include disk drives, keyboards, video display screens, mouse pointers, printers, card readers, scanners (such as barcode, fingerprint, iris, QR code, and other types of scanners), RFID devices, tape drives, touch screens, video cameras, still cameras, movement sensors, network cards, storage devices, microphones, audio speakers, styli and transducers, and associated interfaces and drivers.

A network may comprise a cellular network, the Internet, intranet, local area network (LAN), wide area network (WAN), Metropolitan Area Network (MAN), other types of area networks, cable television network, satellite network, telephone network, public networks, private networks, wired or wireless networks, virtual, switched, routed, fully connected, and any combination and subnetwork thereof. The network may use a variety of network devices, such as routers, bridges, switches, hubs, repeaters, converters, receivers, proxies, firewalls, translators and the like. Network connections may be wired or wireless, and may use multiplexers, network interface cards, modems, IDSN terminal adapters, line drivers, and the like. The network may comprise any suitable topology, such as point-to-point, bus, star, tree, mesh, ring and any combination or hybrid thereof.

Communication in and among computers, I/O devices and network devices may be accomplished using a variety of protocols. Protocols may include, for example, signaling, error detection and correction, data formatting and address mapping. For example, protocols may be provided according to the seven-layer Open Systems Interconnection model (OSI model), or the TCP/IP model.

Although the disclosed system and method and its advantages have been described in detail, it should be understood that various changes, substitutions and alterations can be made herein without departing from the subject matter hereof as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

We claim:

1. A method of navigating a health insurance provider automated telephone answering system (TAS), the method comprising:
   accessing a recording of a first audible interaction with a health insurance provider TAS, the recording comprising two or more prompts from a health insurance provider TAS and responses to the prompts, the two or more prompts comprising at least one of the following patient information: a patient ID, a healthcare provider ID and/or a patient date of birth;
   dividing said recording into two or more segments, each segment comprising one of the two or more prompts and the response to said one prompt;
   after dividing the recording, displaying each segment for review using a call script editor including an interface, the interface configured to present an audible recording or a text version of each of the two or more prompts and the responses provided for the two or more prompts, the call script editor further configured to receive a user input to revise or confirm the responses in order to provide verified segments, each of the verified segments including a verified response for an associated prompt;
   selecting one or more keywords for at least one of said verified segments;
   receiving said user input to revise or confirm the responses in order to provide said verified segments;
   storing the verified segments as a call script file;
   establishing a connection by telephone with the health insurance provider TAS;
   using the call script file to audibly interact in a second audible interaction with the health insurance provider TAS, the second interaction including:
   converting at least one TAS prompt from an audible form to text using a speech-to-text engine;
   comparing the text to the one or more keywords in order to associate the at least one TAS prompt with a verified response included in said call script file; and
   responding to the at least one TAS prompt using the verified response.

2. The method of claim 1, further comprising specifying one or more segments in which the prompt thereof is to be transcribed to text.

3. The method of claim 2, further comprising associating the call script with the health insurance provider.

4. The method of claim 3, further comprising associating one or more patients with the health insurance provider.

5. The method of claim 1, further comprising recording at least a portion of the second audible interaction.

6. The method of claim 5, further comprising:
   using the speech-to-text engine to transcribe a portion of the recording, the portion comprising patient-specific health insurance benefit information; and
   associating the transcribed portion with the patient.

7. The method of claim 5, further comprising:
   detecting termination of health insurance provider TAS operation;
   detecting telephonic hand-off of health insurance provider TAS operation to a human operator; and
   telephonically connecting the human operator with a human user.

8. The method of claim 7, further comprising:
   in detecting telephonic handoff of health insurance provider TAS operation to a human operator, further detecting an existence of a call hold state;
   if said call hold state is detected, then monitoring the call hold state to detect termination of the call hold state; and
   upon termination of the call hold state, notifying a human user.

9. The method of claim 5, further comprising:
   in the second audible interaction, if the one or more keywords do not substantially correspond to a first prompt of the two or more prompts, then notifying a human user.

10. The method of claim 9, further comprising:
    determining if the one or more keywords substantially correspond to a second prompt of the two or more prompts; and
    if the one or more keywords substantially correspond to the second prompt, then responding to the second prompt according to the call script, and if the one or more keywords do not substantially correspond to the second prompt, then notifying a human user.

11. The method of claim 9, further comprising:
    receiving user input specifying a change to the call script; and
    saving the change to the call script.

12. The method of claim 5, further comprising providing a call history indicating successful calls for which insurance coverage information was fully received by audible interaction with the healthcare provider TAS and indicating unsuccessful calls in which insurance coverage information was not fully received by audible interaction with the healthcare provider TAS.

13. The method of claim 1, wherein said call script editor is configured to receive user input associated with one or more selectable response types, the response types selectable using the interface and including at least one of patient ID category, healthcare provider ID category and patient date of birth category.

14. A method of navigating a health insurance provider automated telephone answering system (TAS), the method comprising:
    accessing at least one of two or more segments of a recording of a first audible interactions with a health insurance provider TAS, the audible interactions including two or more prompts from a health insurance provider TAS, the two or more prompts comprising a request for at least one of the following patient information: a patient ID, a healthcare provider ID and/or a patient date of birth, each of the two or more segments including one of said two or more prompts;

displaying said at least one segment using a call script editor having a call script editor interface, the interface configured to present an audible recording or a text version of a prompt for said at least one segment;

providing a menu of responses to said prompt and receiving a user input selecting a response from said menu of responses;

storing said response as part of a call script file;

after establishing a connection by telephone with the health insurance provider TAS, using the call script file to audibly interact in a second audible interaction with the health insurance provider TAS, the second audible interaction including:

converting at least one TAS prompt from an audible form to text using a speech-to-text engine;

comparing the text to one or more keywords in order to associate the at least one TAS prompt with said response included in said call script file; and responding to the at least one TAS prompt using said response to obtain health insurance benefit information for a patient.

15. The method of claim 14 said response being a category response comprising at least one of patient ID category, healthcare provider ID category and patient birthday category.

16. The method of claim 15 further comprising using the call script file to obtain health insurance benefit information for a plurality of patients.

17. The method of claim 16, the benefit information for said plurality of patients being obtained with a single connection by telephone.

18. A system for navigating a health insurance provider automated telephone answering system (TAS), the system comprising:

a computer configured to perform call script editing, the computer configured to:

access at least one of two or more segments of a recording of an audible interaction with a health insurance provider TAS, the audible interaction including two or more prompts from a health insurance provider TAS, the two or more prompts comprising a request for at least one of the following patient information: a patient ID, a healthcare provider ID and/or a patient date of birth, each of the two or more segments including one of said two or more prompts;

display said at least one segment using a call script editor graphical user interface, the interface configured to present an audible recording or a text version of a prompt for said at least one segment;

provide a menu of responses to said prompt and receiving a user input selecting a response from among said menu of responses;

create a call script file linking said prompt with said response;

establish a connection by telephone with a health insurance provider TAS; and audibly interact with a health insurance provider TAS using the call script file, the audible interaction including converting at least one TAS prompt from an audible form to text using a speech-to-text engine, comparing the text to one or more keywords in order to associate the at least one TAS prompt with said response included in said call script file, and responding to the at least one TAS prompt using said response to obtain benefit information for a patient.

19. The system of claim 18 further comprising a telephone system configured for operation using said computer.

20. The system of claim 18, said computer comprising a server computer configured for accessing recorded data from a server database.

* * * * *